US006381616B1

(12) United States Patent
Larson et al.

(10) Patent No.: US 6,381,616 B1
(45) Date of Patent: Apr. 30, 2002

(54) SYSTEM AND METHOD FOR SPEEDING UP HETEROGENEOUS DATA ACCESS USING PREDICATE CONVERSION

(75) Inventors: Gustav Per-Åke Larson; Weiye Zhang, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/275,704

(22) Filed: Mar. 24, 1999

(51) Int. Cl.[7] .............................................. G06F 12/00
(52) U.S. Cl. ...................... 707/201; 707/500; 707/523; 707/100; 707/4
(58) Field of Search ................................ 707/1, 2, 3, 4, 707/10, 500, 517, 523, 100, 102, 200, 201

(56) References Cited

U.S. PATENT DOCUMENTS

| | | | |
|---|---|---|---|
| 4,701,746 A | * 10/1987 | Ueda et al. | 340/347 DD |
| 4,858,114 A | * 8/1989 | Heath et al. | 364/200 |
| 5,414,834 A | * 5/1995 | Alexander et al. | 395/600 |
| 5,416,917 A | * 5/1995 | Adair et al. | 395/500 |
| 5,640,550 A | * 6/1997 | Coker | 395/604 |
| 5,758,125 A | * 5/1998 | Misinai et al. | 395/500 |
| 5,802,293 A | * 9/1998 | van der Sijpt | 395/200.33 |
| 5,832,100 A | * 11/1998 | Lawton et al. | 382/100 |
| 6,029,178 A | * 2/2000 | Martin et al. | 707/201 |
| 6,134,591 A | * 10/2000 | Nickles | 709/229 |
| 6,185,729 B1 | * 2/2001 | Watanabe et al. | 717/1 |

OTHER PUBLICATIONS

Edward et al. (Using semantic values to facilitate interoperability among heterogeneous information systems, ACM Transaction on Database System, vol. 19, No. 2, Jun. 1994, pp. 254–290).*

IBM TDB (Object–Oriented National Language Support Character Data Representation Implementation, vol. 34, No. 10B, Mar. 1992).*

IBM TDB (Compare Text, vol. 33, issue 9, pp. 422–425, Feb. 1, 1991).*

Bright, M. W.; Hurson, A.R.; Pakzad, S.H., "A Taxonomy and Current Issues in Multidatabase Systems," *Computer*, Mar. 1992, pp. 50–60.

Socher, Rolf, "Optimizing the Clausal Normal Form Transformation," *Journal of Automated Reasoning* 7, 1991, pp. 325–336.

* cited by examiner

*Primary Examiner*—Hosain T. Alam
*Assistant Examiner*—Joon Hwan Hwang
(74) *Attorney, Agent, or Firm*—Woodcock Washburn LLP

(57) ABSTRACT

A system and method for modifying or converting predicates involving a comparison with a string constant in a query is provided so that the predicates can be evaluated by an external or remote source that uses a different collating sequence, thereby effectively reducing the amount of data sent over a network. Techniques for predicate simplification are also provided for complex predicates. Although it is desirable that the converted predicate precisely match the original predicate, it is not necessary; an imprecise predicate that selects a superset of the target rows is sufficient. Thus, techniques for imprecise conversion are also provided. For an imprecise conversion, the original query is further evaluated against the obtained superset to obtain the final result, whereas for a precise conversion, the returned set is the required set, and no further evaluation is needed.

26 Claims, 10 Drawing Sheets

Collating Sequences for ASCII and EBCDIC

ASCII:
!"#$%&'()*+,-./0123456789:;<=>?@ABCDEFGHIJKLMNOPQRSTUVWXYZ[\]^_`abcdefghijklmnopqrstuvwxyz{|}~

EBCDIC:
.<(+|&!$*);-/,%_>?`:#@'="abcdefghijklmnopqr~stuvwxyz[]{ABCDEFGHI}JKLMNOPQR\STUVWXYZ0123456789

FIG. 1

SYSTEM AND METHOD FOR SPEEDING UP HETEROGENEOUS DATA ACCESS USING PREDICATE CONVERSION

TECHNICAL FIELD

This invention relates in general to database management systems performed by computers. More particularly, this invention relates to efficient processing of database queries involving selection against heterogeneous data.

BACKGROUND OF THE INVENTION

Heterogeneous data access is becoming an important feature in database systems because it facilitates the integration of information from a variety of data sources. The performance of queries involving external data sources is greatly affected by the cost of transporting data over the network. This cost can be reduced by pushing down subqueries, particularly selections and projections, to the external data source. However, if the external data source uses a different collating sequence, predicates consisting of comparison of a column (also known as a field) with a string constant cannot be pushed down unchanged. A "predicate" is a qualifier or condition for a search.

A collating sequence is essentially the computer equivalent of alphabetical order. One typical collating sequence is the order of characters based on their binary values in ASCII (American Standard Code for Information Interchange) and another typical collating sequence is the order of characters based on their binary values in EBCDIC (Extended Binary-Coded Decimal (BCD) Interchange Code). Although these two sequences have similar characters or collating elements, their collating sequences (sort orders) are significantly different, as shown in FIG. 1. For example, both collating sequences contain all the capital and lower case letters of the (English) alphabet, but in the ASCII capital letters all sort before lower case letters but in EBCDIC this is reversed. Also, in ASCII digits sort before letters but not in EBCDIC.

A collating sequence is separate from a character (code) set: two countries or languages may use the same character set but have different collating sequences. A list of different language identifiers having similar character sets but different collating sequences is shown in Table 1. The purpose of a collating sequence is to define a total order on character strings. This is done by means of weights assigned to collating elements, which most often correspond to a single character but may consist of a sequence of characters. For example, in Spanish, the sequence "11" is treated as a single collating element. In the simplest case, each character is assigned a unique weight. To determine the ordering of two strings, the weights of the characters are compared proceeding from left to right. If the two strings compare equal on the first level weights, they are compared on second level weights (if any), then on third level weights, and so on.

TABLE 1

| Language Name | Language String |
| --- | --- |
| Czech | "czech" |
| Danish | "danish" |
| Dutch (Belgian) | "dutch-belgian" |
| Dutch (default) | "dutch" |
| English (Australian) | "australian" |
| English (Canadian) | "canadian" |
| English (default) | "english" |
| English (New Zealand) | "english-nz" |

TABLE 1-continued

| Language Name | Language String |
| --- | --- |
| English (UK) | "english-uk" |
| English (USA) | "american-english" |
| Finnish | "finnish" |
| French (Belgian) | "french-belgian" |
| French (Canadian) | "french-canadian" |
| French (default) | "french" |
| French (Swiss) | "french-swiss" |
| German (Austrian) | "german-austrian" |
| German (default) | "german" |
| German (Swiss) | "swiss" |
| Hungarian | "hungarian" |
| Icelandic | "icelandic" |
| Italian (default) | "italian" |
| Italian (Swiss) | "italian-swiss" |
| Norwegian (Bokmal) | "norwegian-bokmal" |
| Norwegian (default) | "norwegian" |
| Norwegian (Nynorsk) | "norwegian-nynorsk" |
| Polish | "polish" |
| Portuguese (Brazilian) | "portuguese-brazilian" |
| Portuguese (default) | "portuguese" |
| Spanish (default) | "spanish" |
| Spanish (Mexican) | "spanish-mexican" |
| Spanish (Modern) | "spanish-modern" |
| Swedish | "swedish" |

Many database systems, including SQL Server, support queries over heterogeneous data sources. If the system detects that some tables referenced in a query are managed by external data sources, the system decomposes the query into a set of single-source queries, submits them, and performs any additional processing needed to integrate the data returned from the local queries. External data sources differ greatly in their query capabilities and interfaces, ranging from simple one-table sources with no query capability to full-fledged SQL database systems. Many aspects of heterogeneity in multidatabase systems, such as data model differences, naming differences, format differences, structure differences, and conflicting data, have been studied and are described in Bright, M. W. et al., "A taxonomy and current issues in multidatabase systems", IEEE Computer, March 1992, pages 50–60.

Many data sources have selection (i.e., filtering) and projection capability. A query optimizer decomposes the query and generates an overall, efficient plan. Often this means delegating as much as possible of the processing to the external data sources, taking into account their processing capabilities. In particular, pushing down selections and projections to an external data source is usually desirable because it reduces the amount of data shipped over the network. However, if the external data source uses a different collating sequence, predicates- involving string comparisons cannot be pushed down unchanged. In practice, systems do not push down such predicates, thereby resulting in a loss of efficiency.

For example, consider a SQL Server running on a Windows NT system that uses the (binary) ASCII collating sequence (WINDOWS NT® is a registered trademark of Microsoft Corp.). Among other things, it provides access to a course table that is stored in a DB2 database running on a mainframe system that uses the (binary) EBCDIC collating sequence. (DB2 is a trademark of International Business Machines Corp.) Suppose the SQL Server receives the query "select CourseNo from course where CourseNo is between 'CH020' and 'CS499'", and the table has 1000 records and the query will select 100 of the records. If the selection predicate can be pushed down and evaluated at the source, the data communication cost would be reduced by 90% because only the data satisfying the selection predicate would need to be transferred to SQL server.

However, the two systems use different collating sequences, and so the query cannot just be pushed unchanged. Doing so would produce the wrong result. As shown in FIG. 1, 'E' collates after '0' in the (binary) ASCII collating sequence but before '0' in the (binary) EBCDIC collating sequence. Thus, for example, courses with prefix 'CHE' will be selected if the query is evaluated by SQL Server, but not if it is evaluated by DB2. Typical systems handle queries of this type by retrieving all course rows and evaluating the predicate at the query site. There is a need for a mechanism to convert comparisons between a string valued column (field) and a constant to correctly account for differences in collating sequences.

Many atomic SQL predicates are independent of the collating sequence; this is true for operators such as IS NULL and IS NOT NULL. Similarly, comparisons of numeric data types (integer, float, decimal) and dates are independent of the collating sequence. BETWEEN and NOT BETWEEN are simply shorthand notation for two comparisons. IN and NOT IN followed by a set of string constants can be transformed into a set of predicates with equals (=) and not equal (<>) operators. Therefore, the predicates requiring conversion are mainly string comparisons using one of the operators <, $\leq$, >, and $\geq$. Predicates with operators=and <>may require conversion when some characters have the same weight in the collating sequence.

Although the art of database query processing is well developed, there remain some problems inherent in this technology, particularly sending a query between databases having different collating sequences. Therefore, a need exists for compensating for differences in collating sequences using predicate conversion that overcomes the drawbacks of the prior art.

SUMMARY OF THE INVENTION

The present invention is directed to a method for use in a heterogeneous database environment including a first data source using a first collating sequence ($I_1$) and a second data source using a second collating sequence ($I_2$). The method comprises the steps of: receiving a query including a source predicate ($e_1$) for the first collating sequence $I_1$; converting the source predicate e1 to a target predicate ($e_2$) for the second collating sequence $I_2$; and submitting the target predicate $e_2$ to the second data source.

According to one aspect of the present invention, the source predicate $e_1$ is converted to the target predicate $e_2$ in accordance with a conversion table.

According to another aspect of the present invention, the method further comprises the step of simplifying the target predicate $e_2$ prior to submitting the converted query to the second data source. The step of simplifying comprises at least one of the steps of combining range values, exploiting domain constraints, and reducing to prime implicants. Combining range values comprises the steps of obtaining a set of intervals defined in the target predicate $e_2$, and combining the set of intervals into at least one larger interval by taking the union of some of the intervals. Exploiting domain constraints comprises the steps of: detecting at least one external constraint at the second data source; and modifying the target predicate $e_2$ taking into account this constraint. Reducing to prime implicants comprises the steps of: converting the target predicate $e_2$ to conjunctive normal form; eliminating redundant atomic predicates from the target predicate $e_2$; converting the target predicate $e_2$ to disjunctive normal form; deleting contradictory terms and empty ranges from the target predicate $e_2$; and converting the target predicate $e_2$ to conjunctive normal form.

According to another aspect of the present invention, each of the first and second collating sequences comprises either ASCII or EBCDIC. (This is just an example, not a condition for predicate conversion. The source and target collating sequences are not limited to ASCII and EBCDIC.)

According to a further aspect of the present invention, the step of converting comprises a step of imprecise conversion of the source predicate $e_1$. According to one method of imprecise conversion, the source predicate $e_1$ comprises a plurality of predicates, and the step of imprecise converting comprises discarding at least one of the plurality of predicates. According to another method of imprecise converting, the source predicate $e_1$ comprises a string of characters, and the step of imprecise conversion comprises truncating the string of characters. According to another method of imprecise conversion, the source predicate $e_1$ comprises a plurality of ranges, and the step of imprecise conversion comprises merging at least two of the ranges into a larger range covering the two input ranges.

Another embodiment within the scope of this invention includes a conversion table for use in the method described above. Preferably, the conversion table comprises a plurality of rules for converting characters from the first collating sequence $I_1$ operated on by one of a plurality of operators to the second collating sequence $I_2$, such that the query comprising the source predicate $e_1$ can be converted to the target predicate $e_2$ by applying the rules. The operators comprise less than (<), less than or equal to ($\leq$), greater than (>), and greater than or equal to ($\geq$). Each of the rules is either precise or imprecise.

Another embodiment within the scope of this invention includes a method for generating a conversion rule for a conversion table between a first collating sequence ($I_1$) having a first plurality of characters, each having a respective weight, and a second collating sequence ($I_2$) having a second plurality of characters, each having a respective weight. The method comprises the steps of: for a subject character operated on by an operator, the subject character being one of the first plurality of characters and the operator being one of less than (<), less than or equal to ($\leq$), greater than (>), and greater than or equal to ($\geq$), determining which ones of the first plurality of characters in the first collating sequence have a weight that satisfies the operator operating on the subject character; detecting the characters in the second collating sequence that correspond to the first plurality of characters that have been determined to have a weight that satisfies the operator operating on the subject character; and determining at least one interval of the detected characters, where the conversion rule is responsive to the at least one interval.

According to one aspect of the present invention, the method further comprises the step of OR'ing each interval of the at least one interval together to form the conversion rule.

According to another aspect of the present invention, each respective weight in the first collating sequence is different and each respective weight in the second collating sequence is different.

According to another aspect of the present invention, each respective weight consists of only one level weight.

According to further aspects of the present invention, at least two respective weights in one of the first collating sequence and the second collating sequence are identical, and the method further comprises the steps of determining which of the characters in the first collating sequence have the same weight as the subject character; and prior to determining the at least one interval, detecting the characters in the second collating sequence that correspond to the first plurality of characters that have been determined to have the same weight as the subject character.

According to further aspects of the present invention, each respective weight comprises at least a primary weight and a secondary weight, and the method further comprises the steps of: detecting each character in the second collating sequence that has the same primary weight as the character that corresponds to the subject character; determining sequences of adjacent detected characters at the second collating sequence; determining which of the detected characters has a lowest primary weight; determining which of the detected characters has a highest primary weight; determining at least one interval of the characters of the second collating sequence having the lowest primary weight character and the highest primary weight character as a lowest and a highest endpoint, respectively; determining if there is more than one character in each the interval that has the lowest primary weight, and if so, changing the lowest endpoint to a character having a next lowest primary weight; and determining if there is more than one character in each the interval that has the highest primary weight, and if so, changing the highest endpoint to a character having a next highest primary weight.

Another embodiment within the scope of this invention includes a heterogeneous database system, comprising: a first data source using a first collating sequence ($I_1$); a second data source using a second collating sequence ($I_2$); a conversion table generator; a conversion table generated by the conversion table generator; and a predicate converter for receiving a query including a source predicate ($e_1$) for $I_1$ and, using the conversion table, converting $e_1$ to a target predicate ($e_2$) for $I_2$.

According to one aspect of the present invention, the database system further comprises a predicate simplifier for simplifying the target predicate $e_2$.

According to another aspect of the present invention, the first collating sequence $I_1$ and the second collating sequence $I_2$ each comprise a plurality of characters, each character having a weight, at least two of the characters in at least one of the first and second collating sequences having identical weights.

According to a further aspect of the present invention, the first collating sequence $I_1$ and the second collating sequence $I_2$ each comprise a plurality of characters, each character having multiple weights.

The foregoing and other aspects of the present invention will become apparent from the following detailed description of the invention when considered in conjunction with the accompanying drawings.

BRIEF DESCRIPTION OF THE DRAWINGS

FIG. 1 shows a collating sequence for ASCII and a collating sequence for EBCDIC;

DETAILED DESCRIPTION OF THE PREFERRED EMBODIMENT

When a database system retrieves data from a remote or external data source, pushing down evaluation of selection predicates to the external data source, provided that it has selection capability, can reduce communication costs. However, if the systems use different collating sequences, predicates involving string comparisons cannot be pushed down unchanged. The present invention is directed to a system and method for modifying or converting predicates in a query so that they can be pushed down to an external or remote source, thereby effectively reducing the amount of data sent over network. More specifically, the present invention is directed to a system and method for converting predicates containing a comparison of a column or field with a string constant. The resulting predicate may be complex so techniques for predicate simplification are also described herein. Although it is desirable that the converted predicate substantially precisely match the original predicate, it is not necessary; an imprecise predicate that selects a superset of the target rows is sufficient. Thus, techniques for imprecise conversion are also described herein. For an imprecise conversion, the original query is further evaluated against the obtained superset to obtain the final result, whereas for a precise conversion, the returned set is the required set, and no further evaluation is needed. The present invention reduces data communication cost without adding much additional work to the remote database system (also referred to herein as an external data source).

Computer Environment

Figure 2:
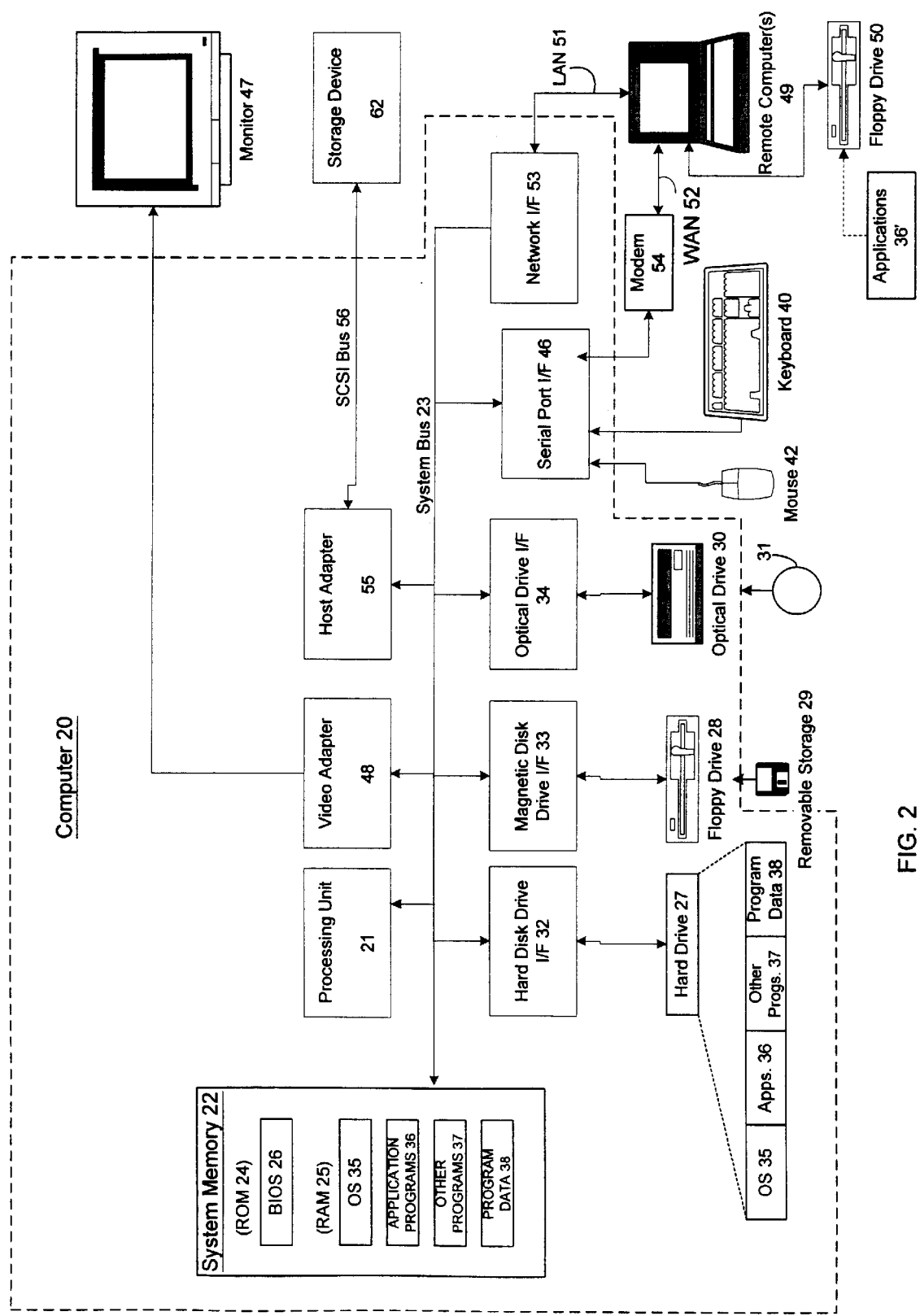
FIG. 2 is a block diagram representing a computer system in which aspects of the present invention may be incorporated.

Database systems are implemented on a computer. FIG. 2 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 2, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Network Environment

Figure 3:
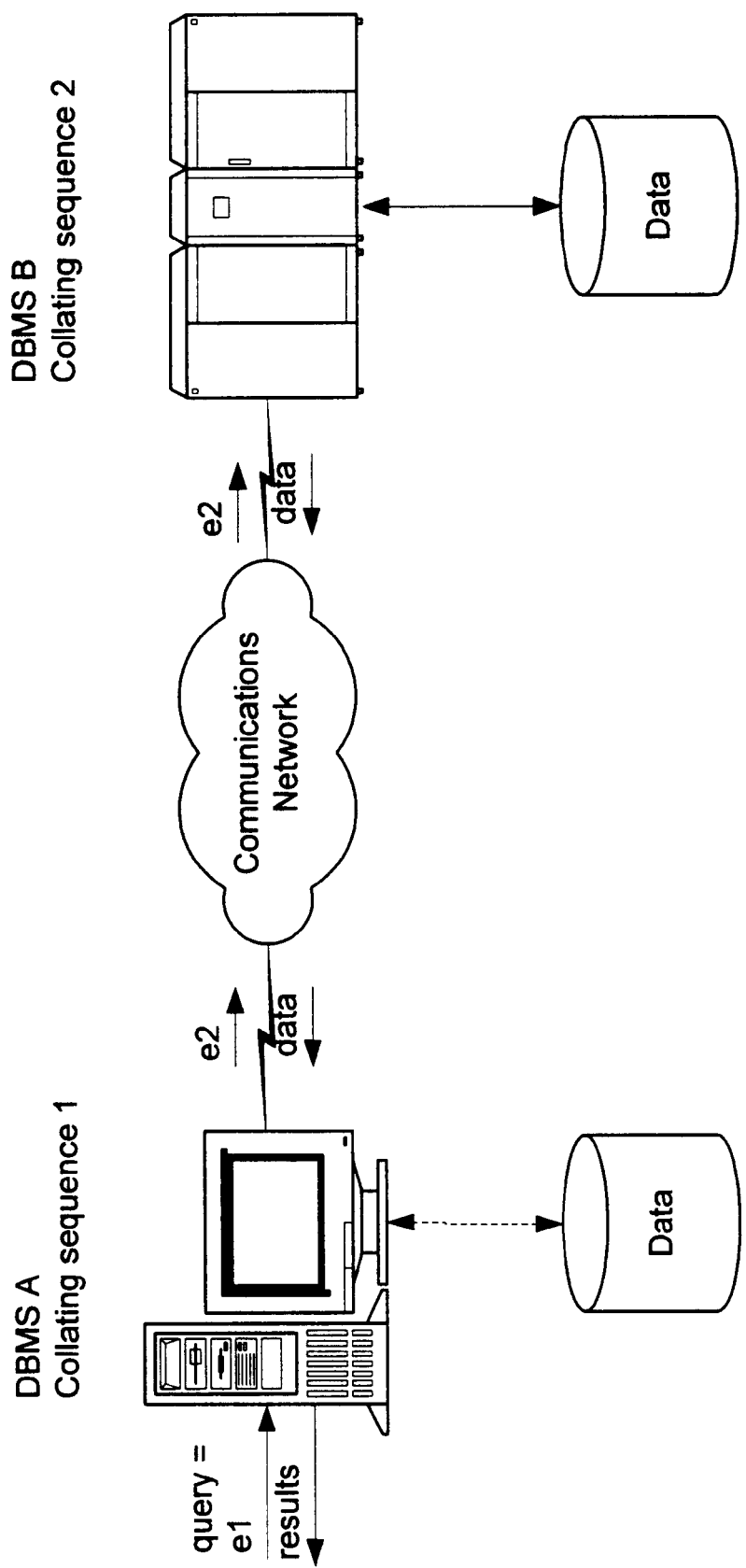
FIG. 3 is a schematic diagram representing a network in which aspects of the present invention may be incorporated.

As noted, the computer described above can be deployed as part of a computer network. In general, the above description applies to both server computers and client computers deployed in a network environment. FIG. 3 illustrates one such exemplary network environment in which the present invention may be employed.

The exemplary system of FIG. 3 comprises a database system, DBMS A, implemented on a desktop computer. The DBMS A server is connected via a communications network (e.g., a local or wide area network) to another database server, DBMS B, which in this example is implemented on a mainframe computer. DBMS A employs a collating sequence 1 (e.g., ASCII) whereas DBMS B employs a different collating sequence 2 (e.g., EBCDIC). As described in greater detail below, a query comprising a predicate e, submitted to DBMS A is converted in accordance with the present invention to a query comprising a modified predicate $e_2$ and is then transmitted to DBMS B. The query with the converted predicate $e_2$ is evaluated by DBMS B and any records satisfying the query predicate is transmitted over the communications network back to DBMS A. By converting the predicate $e_1$ to a predicate $e_2$ suitable for the collating sequence used by DBMS B, the present invention avoids the need to send the entire target table(s) to DBMS A for evaluation of the query.

The presently preferred methods for predicate conversion will now be explained in greater depth.

Predicate Conversion for Heterogeneous Database System

Given two collating sequences, the present invention is directed to generating a table that contains a set of conversion rules. Predicates consisting of a comparison between a column or a field and a single character can be converted by directly applying the rules in the conversion table. This technique is extended to convert predicates containing longer character strings.

As described herein, it is assumed that the collating sequence at the remote or external data source includes at least all the characters in the collating sequence at the query site. In the description herein, it is assumed that, the query site uses an ASCII collating sequence and the external data source uses an EBCDIC collating sequence, although any collating sequence can be used at the query site and the external data source. Also, for ease of description, it is assumed that each character has a single weight equal to its code point (numeric value) and that source predicates are in conjunctive normal form (CNF).

With respect to the first embodiment described herein, it is assumed that each character has a unique weight in each of the two collating sequences. The present invention achieves a general solution that works for any pair of collating sequences by a rule-based or table-driven design that separates the mechanics of predicate conversion from the conversion rules.

Figure 4:
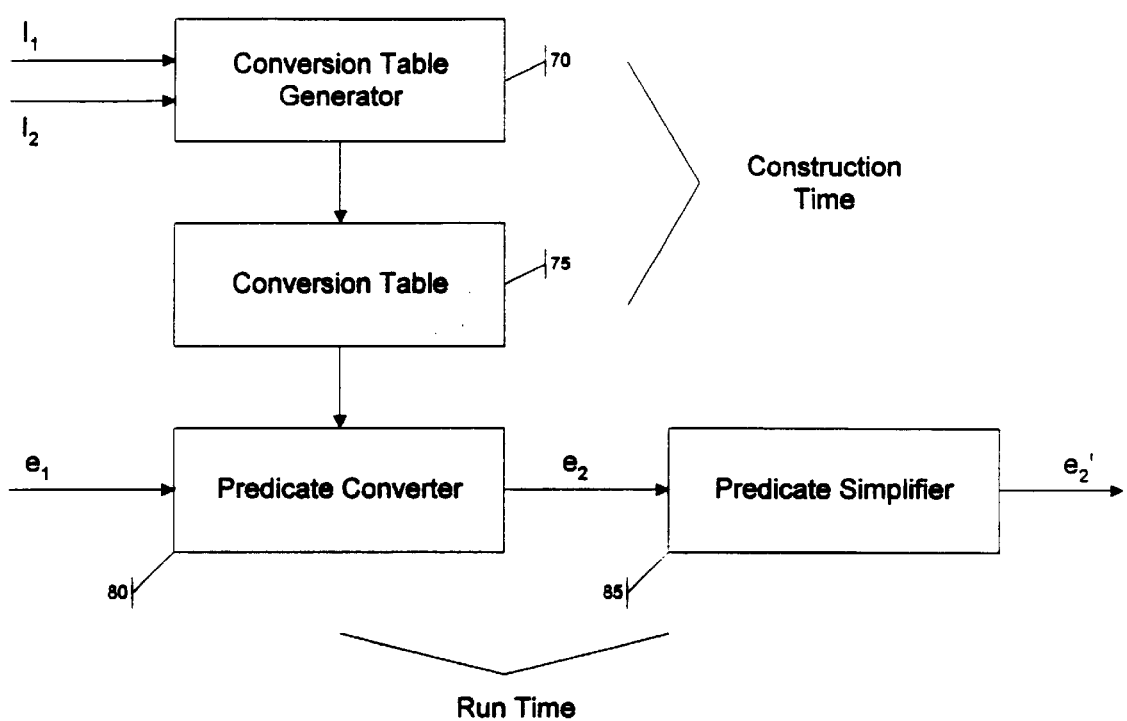
FIG. 4 shows a block diagram of an exemplary database query conversion system in accordance with the present invention.

FIG. 4 shows a block diagram of an exemplary database query conversion system in accordance with the present invention. A conversion table generator 70 receives two collating sequences $I_1$ and $I_2$ and generates a conversion table 75, using methods described herein (e.g., with respect to FIGS. 5A–5D). The conversion table 75 contains a set of rules for predicate conversion. The conversion table 75 is constructed once at 'construction time', before it is needed and used repeatedly at 'run time' for predicate conversion. At 'run time', a source predicate ($e_1$) included in a query received at the query site is converted to a target predicate ($e_2$) by a predicate converter 80 which uses the conversion table 75 in making the conversion. Optionally, the target predicate ($e_2$) is then simplified (to $e_2'$) by a predicate simplifier 85, described below, before the converted query is sent to the remote database system for execution. The conversion table 75 can be stored in non-volatile memory, such as disk, at the query site. The conversion table generator 70, predicate converter 80, and predicate simplifier 85 are preferably implemented in software, wherein such operations are enabled by programming. However, the system of the present invention can be implemented in general purpose computers using firmware, or exclusively in special purpose hardware, or in a combination of the two.

Figure 5A:
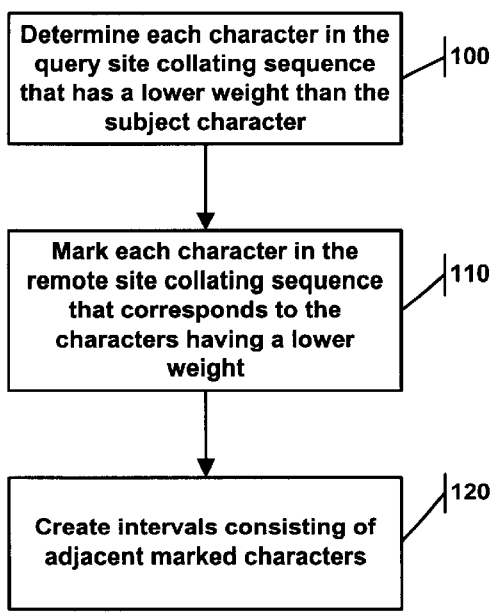
FIGS. 5A–5D are flowcharts of an exemplary method for generating a set of conversion table rules for a conversion table in accordance with the present invention.

FIGS. 5A–5D are flowcharts of an exemplary method for generating a set of conversion table rules for a conversion table in accordance with the present invention. For each character, a conversion rule for each one of the operators <, ≦, >, ≧ is determined and stored in the conversion table 75. FIG. 5A is a flowchart of a method for constructing the rules for the operator <. $I_1$ denotes the source collating sequence and $I_2$ denotes the target or remote collating sequence.

It should be noted that before a conversion takes place, the characters in the remote collating sequence are initialized by removing any marking or flagging they may have received in prior conversions. After the characters in the remote collating sequence are initialized, each character in the source collating sequence that has a weight that is lower than the subject character weight (the weight of the character or sort element being searched) is determined, at step 100. The characters in the remote collating sequence that correspond to the characters having a lower weight from step 100 are marked or flagged at step 110. Intervals consisting of adjacent marked characters in the remote collating sequence are generated at step 120. Two characters being adjacent in a collating sequence means there is no character between the two characters. More precisely, there is no character having a weight that is between the weights of the two characters. The intervals generated at step 120 are OR'ed together to make up the rule for the subject character or sort element for the < operator, and are placed into a conversion table.

Figure 5B:
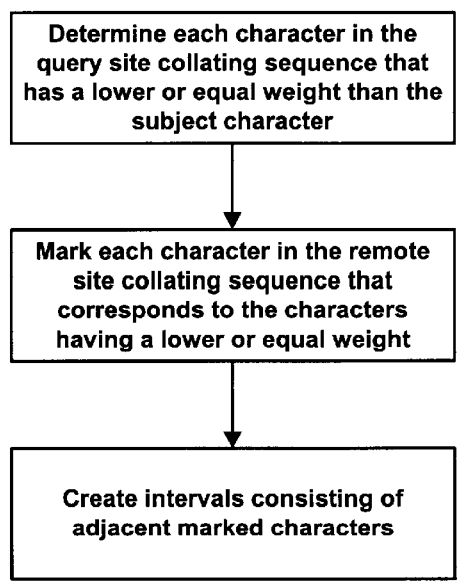
Figure 5C:
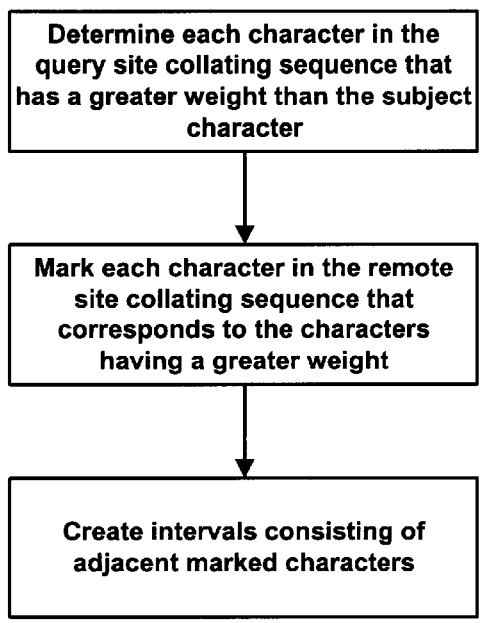
Figure 5D:
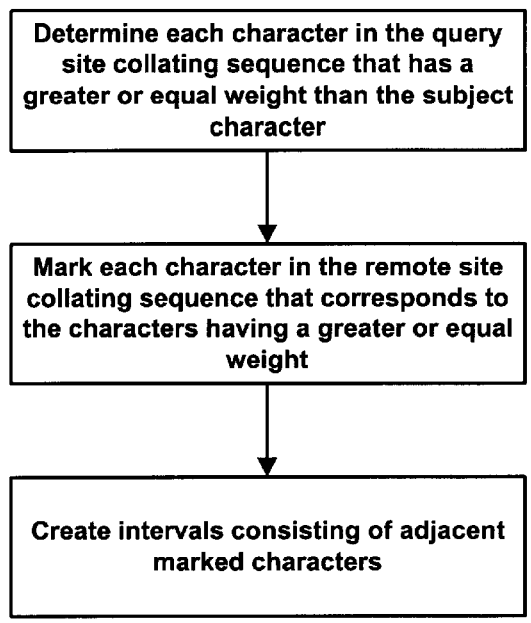

Similar procedures are used to determine the intervals and rules for the other three operators ≦, >, ≧, and are shown in FIGS. 5B–5D, respectively.

Thus, for example with respect to the rules of FIGS. 5A–5D, assuming that $I_1$ is ASCII and $I_2$ is EBCDIC, the intervals for 't' when converting from ASCII to EBCDIC are given below.

For the predicate x<'t', the intervals are [", '+'] ['&', 'r'] 's' ['[', ']'] ['A', 'I'] ['J', "], where ['&', 'r'] represents the characters between '&' and 'r' in the EBCDIC sequence, including '&' and 'r'; 's' represents the single character 's'; and " represents the beginning or the end of a collating sequence. Thus, for the predicate x<'t', the characters in the remote collating sequence that satisfy this query (i.e., the characters in the remote collating sequence that correspond to the characters in the query site collating sequence that satisfy the query) are in the intervals (1) between the start of the remote collating sequence and '+', (2) between '&' and 'r', (3) 's', (4) between '[' and ']', (5) between 'A' and 'I', and (6) between 'J' and the end of the remote collating sequence, inclusive. The characters in these intervals are OR'ed together to make up the rule for the x<'t' predicate, which is placed into a conversion table.

For the predicate x≦'t', the intervals are [", '+'] ['&', 'r'] ['s', 't'] ['[', ']'] ['A', 'I'] ['J', "].

For the predicate x>'t', the intervals are ']"~['u', 'z'] '{"}'.

For the predicate x≧'t', the intervals are ']' '~' ['u', 'z'] '{"}'.

Similarly, the rules for converting '3' and 'B' are given below. "3"

For the predicate x<'3', the intervals are [",'.'] ['(', '+'] ['&', ')'] ['-','%'] '#"" ""' ['0', '2'].

For the predicate x≦'3', the intervals are [", '.'] ['(', '+'] ['&', ')'] ['-', '%'] '#' '"' ""' ['0', '3'].

For the predicate x>'3', the intervals are '<' '|' ';' ['_', ':'] '@' '=' ['a', 'Z'] ['4 ', "].

For the predicate x≧'3', the intervals are '<' '|' ';' ['_', ':'] '@' '=' ['a', 'Z'] ['3', "]. "B"

For the predicate x<'B', the intervals are [", '+'] ['&', '%'] ['>', '?'] [':', '"'] 'A' ']0', "].

For the predicate x≦'B', the intervals are [", '+'] ['&', '%'] ['>', '?'] [':', '"'] 'A', 'B'] ['0', "].

For the predicate x>'B', the intervals are '|' '_' '"' ['a', ' {'] ['C', 'Z'].

For the predicate x≧'B', the intervals are '|' '_' '"' ['a', ' {'] ['C', 'Z'].

Thus, the marking method described above with respect to FIGS. 5A–5D is used to generate the rules that are to be used in the conversion. It should be noted that if the conversion is between two different character sets (as opposed to different collating sequences on the same character set), a translation table is needed for translating the binary code of the characters in the two character sets. In general, each character in the source collating sequence has its conversion rules, and may include non-printable characters.

Although the above description has been directed to each sorting element or character consisting of only one character, the description can be extended to the more complicated scenario when some sort elements contain multiple characters, such as "ll" in Spanish. Such an element is preferably treated as a single character in the collation and has its own conversion rules. During conversion, a look-ahead mechanism is preferably implemented to recognize such elements.

If the predicate to be converted is a comparison with a single-character string, the converted predicate can be constructed by the predicate converter 80 (of FIG. 4) directly from the corresponding rule in the conversion table 75. The converted predicate will be in disjunctive normal form. Each disjunctive term is either a predicate or a conjunction of two predicates. For example, OR'ing the intervals derived above, the predicate x<'t' is converted to:

| | |
|---|---|
| (x ≤ '+') | OR |
| (x ≥ '&' AND x ≤ 'r') | OR |
| (x = 's') | OR |
| (x ≥ '[' AND x ≤ ']') | OR |
| (x ≥ 'A' AND x ≤ 'I') | OR |
| (x ≥ 'J'). | |

Comparisons with longer string constants can also be converted exactly but the resulting expression may be quite complex. The basic idea is described herein by way of an example. Consider the predicate x<'3Bt'. It is first transformed into a longer but equivalent expression:

| | |
|---|---|
| (x < '3Bt') = | |
| (x < '3') | OR |
| (x ≥ '3' AND x < '3B') | OR |
| (x ≥ '3B' AND x < '3Bt'). | |

The first line is a single character comparison that can be converted directly from the conversion table. The second line covers the range ['3', '3B'), that is, the first character must be equal to '3' and the second character must be in the range [", 'B'). This is referred to as a prefixed range and denoted '3'+[", 'B'). The third line is similar and specifies the prefixed range '3B'+[", 't'). These two lines can be converted using the conversion rules for 'B' and 't' by adding the prefix '3' and '3B', respectively, in front of each character in the conversion rules. The resulting predicate follows.

| | |
|---|---|
| (x ≤ '.') | OR |
| (x ≥ '(' AND x ≤ '+') | OR |
| (x ≥ '&' AND x ≤ ')') | OR |
| (x ≥ '-' AND x ≤ '%') | OR |
| (x = '#') | OR |
| (x = '[]P') | OR |
| (x = '"') | OR |
| (x ≥ '0' AND x < '2') | OR |
| (x ≤ '3+') | OR |
| (x ≥ '3&' AND x ≤ '3%') | OR |
| (x ≥ '3>' AND x ≤ '3?') | OR |
| (x ≥ '3:' AND x ≤ '3"') | OR |
| (x = '3A') | OR |
| (x ≥ '30') | OR |
| (x ≤ '3B+') | OR |
| (x ≥ '3B&' AND x ≤ '3Br') | OR |
| (x = '3Bs') | OR |
| (x ≥ '3B[' AND x ≤ '3B]') | OR |
| (x ≥ '3BA' AND x ≤ '3BI') | OR |
| (x ≥ '3BJ'). | |

Note that a prefixed range is converted as a whole and is not converted as two separate string comparisons. In this way, a string comparison is converted into a target predicate for use at the external data source that will produce exactly the same result. Thus, a comparison with a long string can be converted to a comparison with a single-character string and a set of prefixed range predicates.

The converted predicates may be very long and complicated. For example, the comparison x<'t' is converted into nine atomic predicates. A comparison with a long string will produce many more atomic predicates. Very complex predicates increase the optimization and processing cost and, in the worst case, may cause the query to fail (by exceeding some internal limit at the remote database system). To avoid this, it is desirable to simplify the predicates via the predicate simplifier 85. Simplification may be applied before the conversion, after the conversion, or both.

Predicate Simplification

Figure 6C:
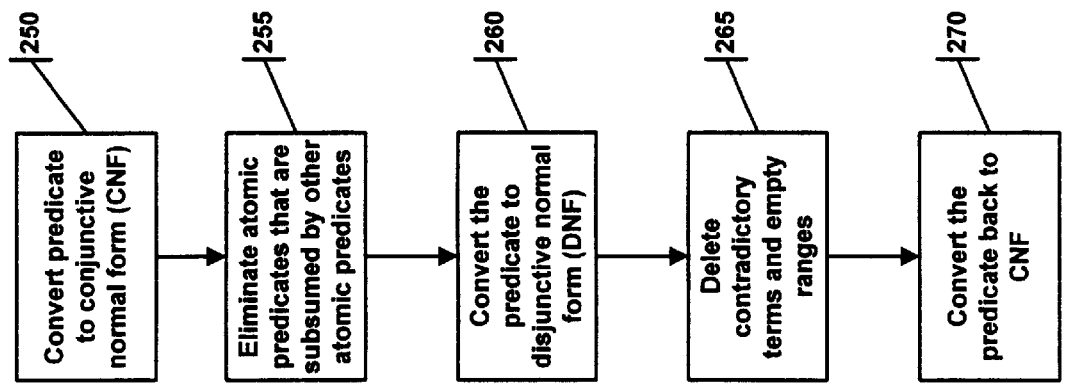
FIG. 6C is a flowchart of a third exemplary method of predicate simplification in accordance with the present invention.
Figure 6B:
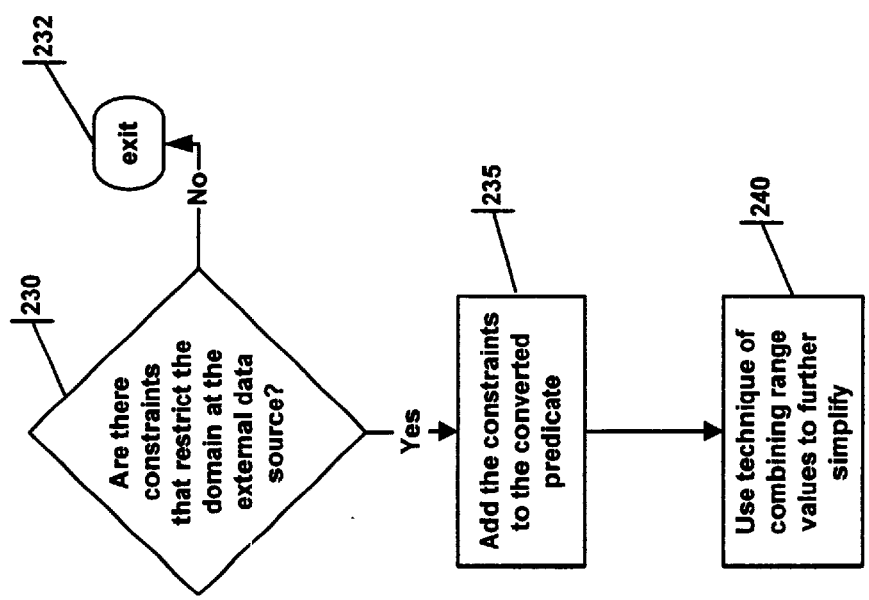
FIG. 6B is a flowchart of a second exemplary method of predicate simplification in accordance with the present invention.
Figure 6A:
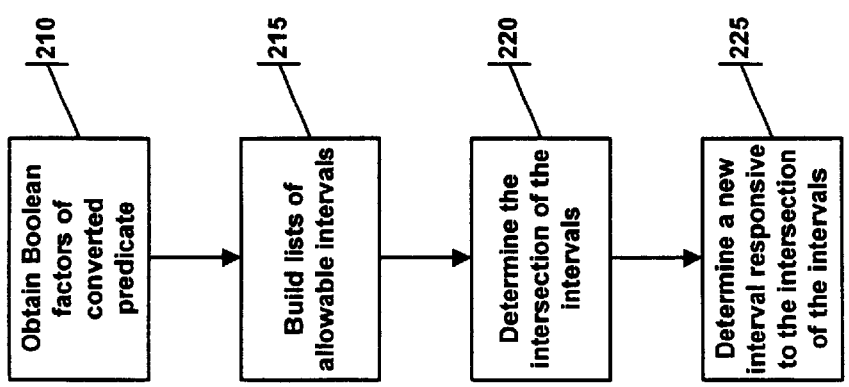
FIG. 6A is a flowchart of a first exemplary method of predicate simplification in accordance with the present invention.

Predicate simplification can be applied using any of the known techniques including: combining value ranges as shown in the flowchart of FIG. 6A, exploiting domain constraints as shown in the flowchart of FIG. 6B, and reducing to prime implicants as shown in the flowchart of FIG. 6C.

A first technique for simplification is combining value ranges as shown in the flowchart of FIG. 6A. Conversion of a string comparison generates many range predicates. These predicates are obtained at step 210. If the source predicate contains several predicates comparing the same column with different string constants, the conversion will generate many range predicates that are redundant or conflicting and can be eliminated. For example, converting the predicate x>'3' AND x<'B' results in

| | |
|---|---|
| (x = '<') | OR |
| x = '\|' | OR |
| x = ';' | OR |
| (x ≥ '_' AND x ≤ ':') | OR |
| x = '@' | OR |
| x = '=' | OR |
| (x ≥ 'a' AND x ≤ 'Z') | OR |
| x ≥ '4') | |
| AND | |
| (x < '+' | OR |
| (x ≥ '&' AND x ≤ '%') | OR |
| (x ≥ '>' AND x ≤ '?') | OR |
| (x ≥ ':' AND x ≤ '"') | OR |
| x = 'A' | OR |
| x > '0') | |

To determine the value ranges that satisfy both sets of comparisons, for each Boolean factor, a list is built, at step 215, containing its allowable intervals, i.e., each element on the list specifies the lower and upper bound of a value range. For the present example, the first list consists of ['<', '<'], ['|', '|'], [';', ';'], ['_', ':'], ['@', '@'], ['=', '='], ['a', 'Z'], ['4', "]

At step 220, the intersection of the intervals is determined; i.e., "multiply" the two lists by computing the intersection of every pair of intervals, one from each of the two lists. If the resulting interval is not empty, output a new element with the lower and upper bound of the intersection, at step 225.

If the predicate contains more than two Boolean factors, repeatedly multiply the result with the next factor. Applying this method to the predicate above reduces it to

| | |
|---|---|
| x = '<' | OR |
| x = ';' | OR |
| x = ':' | OR |
| (x ≥ '>' AND x ≥ '?') | OR |
| x = '=' | OR |
| x = 'A' | OR |
| x ≥ '4' | |

A second technique for simplification is exploiting domain constraints as shown in the flowchart of FIG. 6B. The external data source may include constraints restricting the domain of the column or field involved in a string comparison. It is determined, at step 230, if there are any constraints at the external data source. If not, this simplification method is not used, and processing exits at step 232. If there are constraints at the external data source, the constraints are added to the converted predicate at step 235, and the method of combining ranges described above is used, at step 240, to further simplify the predicate.

Assume that the external data source has a constraint on column x that restricts its values to the range ['0','8']. If this constraint is added to the converted predicate and simplified as describe above, the result shown below is obtained.

| | |
|---|---|
| (x = '<' | OR |
| x = ';' | OR |
| x = ':' | OR |
| (x ≥ '>' AND x ≤ '?') | OR |
| x = '=' | OR |
| x = 'A' | OR |
| x ≥ '4') | |
| AND | |
| (x ≥ '0' AND x ≤ '8') | |
| = | |
| (x ≥ '4' AND x ≤ '8') | |

Taking into account that column values are restricted to the range ['0','8'], the predicate can be further simplified to x≥'4'.

A third technique for simplification is reducing to prime implicants as shown in the flowchart of FIG. 6C. A method for converting between conjunctive normal form (CNF) and disjunctive normal form (DNF) is described in Socher, R, "Optimizing the clausal normal form transformation," Journal of Automated Reasoning, 7(3):325–335, 1991. One property of this method is that it avoids generating redundant clauses, that is, it produces the set of prime implicants of the input formula. In the original method, the basic predicates are uninterpreted but here the method is enhanced with logic for detecting overlapping and empty ranges.

Given an un-normalized predicate, it is first converted to CNF, at step 250. Each Boolean factor now consists of a set of atomic predicates connected by OR. Atomic predicates that are subsumed by other atomic predicates are eliminated in this factor, at step 255. For example, in x>'s' or x>'b', the term x>'s' is subsumed by x>'b' and can be deleted. The predicate is then converted to DNF, at step 260. In DNF, contradictory terms (empty ranges) are detected and eliminated, at step 265. Finally, the result is converted back to CNF, at step 270.

For example, shown below is a predicate that is initially in CNF. Viewed in this form, the predicate does not contain any obvious redundancies.

(x>'3') AND (x<'B') AND (y='Part1' OR x>'Part4')

Once it is converted to DNF, the second term is revealed to contain a contradiction, (x<'B' AND x>'Part4'), and can be eliminated. This results in the simple predicate on the last line (which happens to be in both DNF and CNF).

(x>'3' AND x<'B' AND y='Part1') OR (x>'3' AND x<'B' AND x>'Part4')

=

(x>'3' AND x<'B' AND y='Part1')

Imprecise Conversion

The embodiments described thus far have been directed to exact or precise conversion; that is, the converted predicate selects exactly the same rows or elements as the original predicate. Unfortunately, precise conversion may lead to very complex and time-consuming predicates. This may be undesirable in certain systems and situations. To overcome this, imprecise conversion can be used; that is, converting a predicate to a simple predicate that returns a superset of the desired rows (i.e., all the desired rows and possibly some additional rows), then evaluating the original predicate at the query site to filter out the superfluous rows. It should be noted that imprecise conversion here refers to the creation of imprecise predicates that are applied at the remote system. Imprecise conversion keeps the converted predicate simple while still reducing the amount of data shipped. However, it has the drawback that the original predicate still has to be evaluated at the receiving site, and all the columns involved in that predicate have to be shipped. The usefulness of this approach depends on the incremental data reduction caused by the imprecise predicate. Incremental data reduction is the number of rows returned when the imprecise predicate is included, divided by the number of rows returned when it is not included.

There are many ways to construct an imprecise predicate. The objective is to construct a predicate that is simple but still provides high incremental data reduction. Methods for imprecise conversion include: discarding predicates, truncating long strings, and merging ranges.

A first method for imprecise conversion involves discarding predicates. If the predicate to be converted causes little incremental data reduction, one course of action is to simply drop it.

A second method for imprecise conversion involves truncating long strings. Conversion of a comparison with a long string normally produces a predicate with many atomic predicates. To reduce the complexity of the converted predicates, the string can be replaced with a shorter one before conversion. For example, the predicate x<'3w0vksdfj543kjjgn54' can be replaced by x<'3w1' or x<'3x' before conversion. If the comparison operator is > or ≥, the string can be truncated. If the operator is < or ≤, the last character of the truncated string is rounded up, that is, replaced by the next higher character in the source collating sequence.

A third method for imprecise conversion involves merging ranges. Conversion of a simple string comparison results in a number of range predicates. If two or more ranges are "close", they can be consolidated into a single range, preferably, without significantly affecting the incremental data reduction. For example, conversion of the comparison x<'t' results in

| | |
|---|---|
| (x ≤ '+') | OR |
| (x ≥ '&' AND x ≤ 'r') | OR |
| (x = 's') | OR |
| (x ≥ '[' AND x ≤ ']') | OR |
| (x ≥ 'A' AND x ≤ 'I') | OR |
| (x ≥ 'J') | | which consists of five ranges. EBCDIC has only one character between '+' and '&' and also between 'I' and 'J' so the first two ranges and also the last two may be merged. This results in

| | |
|---|---|
| (x ≤ 'r') | OR |
| (x = 's') | OR |
| (x ≥ '[' AND x ≤ ']') | OR |
| (x ≥ 'A'). | |

If the first two ranges are merged and the last two ranges are merged, this gives (x≤'s') OR (x≥'[').

Figure 7:
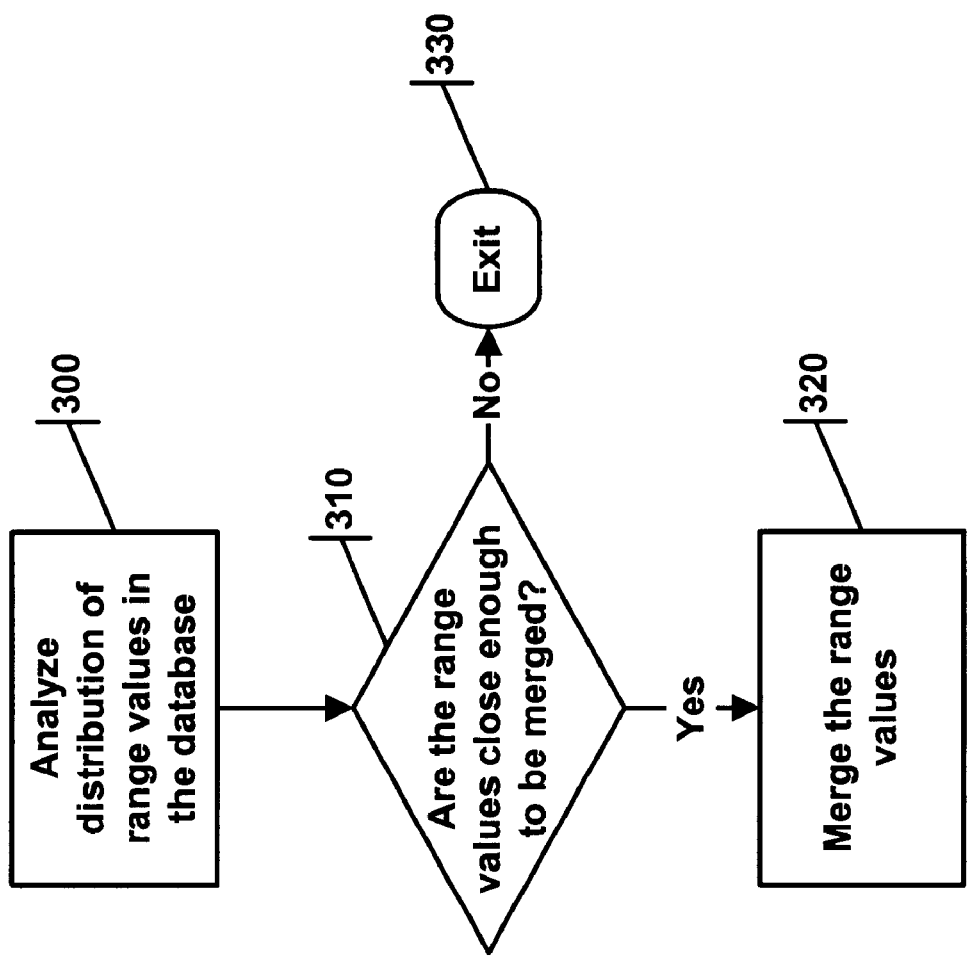
FIG. 7 is a flowchart of an exemplary method of merging ranges for use with imprecise conversion in accordance with the present invention.

Whether or not to merge ranges depends on how "close" is defined. The issue is not the distance (in characters) between ranges; what matters is how merging affects the incremental data reduction. As shown in FIG. 7, the present invention preferably analyzes the distribution of the range values in the database at step 300, and compares the distribution to a predetermined threshold, at step 310. If the threshold is exceeded, then the ranges are merged, at step 320. If the threshold is not exceeded, then the ranges are not merged and the routine exits, at step 330. It should be noted that combining ranges can be applied to the source predicate as well as the converted predicate. The distribution of data can be obtained from histogram if the external data source is able to provide this information. If no histogram is available, but the external data source can provide the highest and lowest value of the data, we can assume that the data is uniformly distributed within this range. If no information is available about the data, we can assume that the data is uniformly distributed within the whole range of the data in its domain.

Handling Elements with Equal Weights

The embodiments described thus far are directed to collating sequences in which each character or collation element has a unique weight in both the source and the target collating sequences. In the embodiment now described, some characters or collating elements in the source, target, or both collating sequences have the same weight. For example, in case insensitive collating sequences, "A" and "a" have the same weight. The methods described above are modified to reflect this change but the basic approach remains the same.

In one embodiment, assume some characters in the source collating sequence have equal weights (e.g. case insensitive order), but each character in the target collating sequence has a unique weight (e.g. case sensitive order). Suppose the two collating sequences are:

Source: 01 . . . 9{aA}{bB}{cC} . . . {zZ}
Target: 01 . . . 9abc . . . zABC . . . Z The source collating sequence is case insensitive, that is, "a" "A" have the same weight in the source, as have "b" and "B", and so on. Now consider what happens when the conversion rule is computed for one of the operators. In this case, characters having the same weight will mark the same set of characters. This means that the characters having the same weight will have the same rules. This situation can be handled by including in the head of a set of rules not just one character but all characters with the same weight (in the source collating sequence). For example, based on the above collating sequences, the rules for "c" and "C" will be:

=>[' ', 'b'][ 'A', 'B']
=>[' ', 'c'][ 'A', 'C']
=>['d', 'z'][ 'D', ' ']
=>['c', 'z'][ 'C', ' ']

for operator <, ≦, >, ≧ respectively.

This is the only change needed. The method for constructing rules, predicate conversion, and predicate simplification remain the same as described above.

Another embodiment is directed to the case when each character in the source collating sequence has a unique weight, but some characters in the target collating sequence have the same weight. This is illustrated by interchanging the roles of the two example sequences above.

Source: 01 . . . 9abc . . . zABC . . . Z
Target: 01 . . . 9{aA}{bB}{cC} . . . {zZ}

Note that although each character is distinguishable in the source set, they may not be distinguishable in the target set. For example, x<"b" in source collating sequence will include "a" but not "A". However, an exact rule for the target collating sequence that includes "a" but not "A" cannot be obtained because "a" and "A" are not distinguishable at the external data source. Thus, precise conversion cannot be achieved in this case. The best that can be achieved is to compute a set of rules that will convert a predicate into an imprecise predicate that selects a superset of the desired rows. The original predicate is then applied on the result set at the query site.

The same marking technique can be used to construct conversion rules. However, in the target collating sequence, when one character is selected, all characters having the same weight as the selected character are marked. If the marked characters in the target set is a superset of the marked characters in the source set, the conversion rule is an imprecise rule (it should be noted that this is different from the imprecise conversion of predicates described above; here, the rule itself is imprecise). If the two sets are equal, the conversion rule is precise. A rule is shown herein as precise if denoted by ==> or imprecise if denoted by ~=>, so that it can be determined whether the rule will result in precise conversion or not. For example, based on the above collating sequences, the rules of 'c' are:

~=>[' ', 'B']
~=>[' ', 'C']
~=>['a', ' ']
~=>['a', ' ']

The first rule is equivalent to [" ", "b"]. The third rule has "a" as the lower bound because, in the source collating sequence, "A" to "Z" satisfy the predicate x>"a".

For some characters, there may be precise rules for some operators and imprecise rules for other operators, namely, for example:

'a'
==>[' ', '9']
~=>[' ', 'A']
~=>['a', ' ']
==>['a', ' ']

For some characters having unique weights in the target collating sequence, there may be precise rules for all four operators, namely, for example:

'5'
==>[' ', '4']
==>[' ', '5']
==>['6', ' ']
==>['5', ' ']

Another embodiment of the present invention is directed to the case in which both the source and the target collating sequences have some characters with the same weight. If the two collating sequences have the same character set and the same sort order, e.g., both use case insensitive dictionary order, this will not affect any predicate and the predicates can be pushed down unchanged. The complication arises when they are different. Consider the following source and target collating sequences (characters within braces have the same weight):

Source: 0 . . . 9{abc}{def}ghij . . . z
Target: 0 . . . 9{abcd}{ef}{gh}ij . . . z This case can be handled by combining the methods described above with respect to the two simpler cases. The marking method can be used to construct conversion rules but, when a character is marked, all characters are marked in its equal-weight set in both the source and the target collating sequences. If the marked characters in the target are a superset of the marked characters in the source, the conversion rule is an imprecise rule. Otherwise, it is a precise rule.

Figure 8:
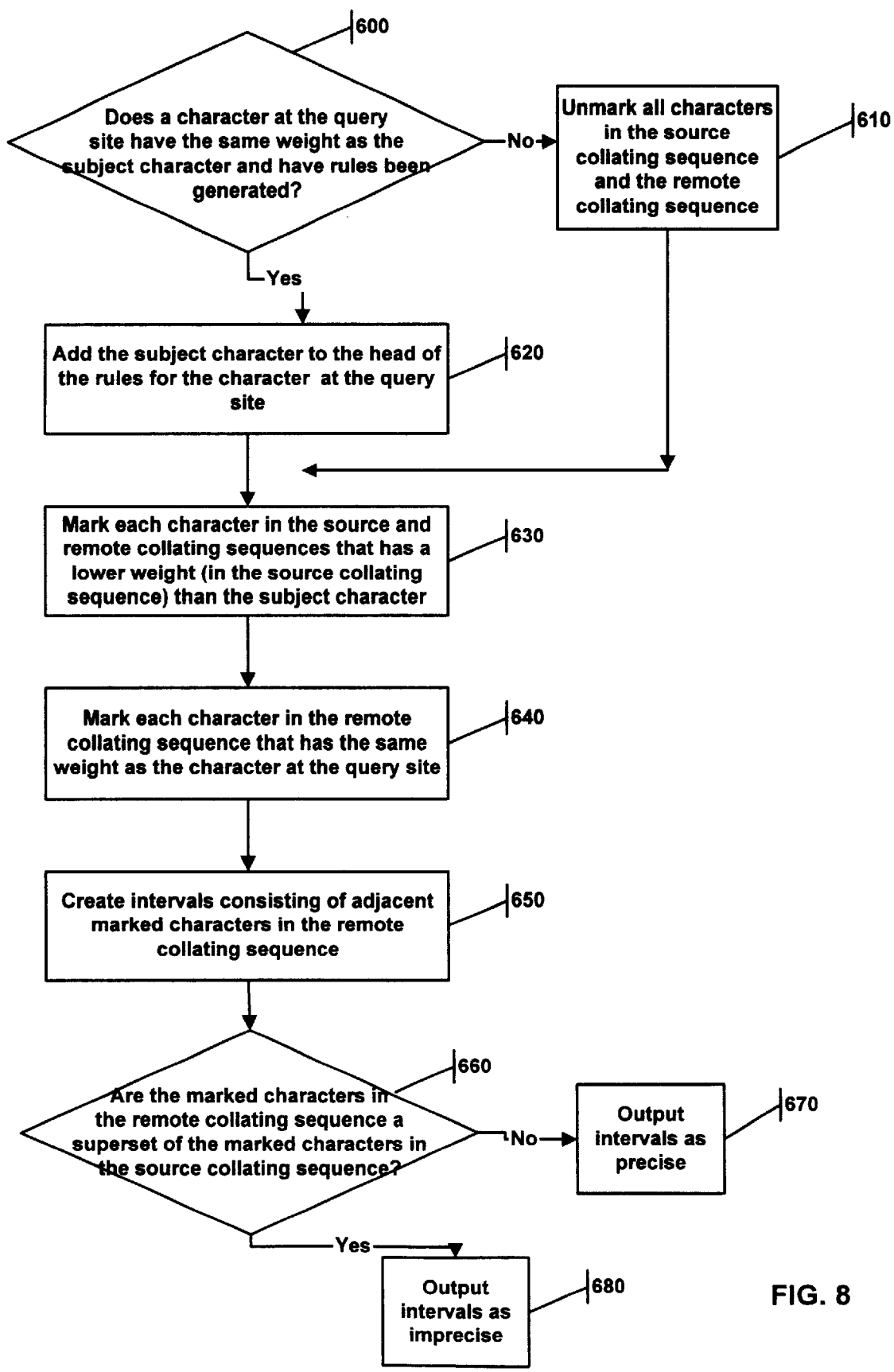
FIG. 8 is a flowchart of an exemplary method for generating the rules of the less than (<) operator when the source and target collating sequences each have characters that have the same weight.

A method for generating the rules of the < operator is described with respect to FIG. 8. The methods for the other three operators are similar. At step 600 it is determined if any character 's' at the query site has the same weight as the subject character and if the rules have been generated for the character 's'. If there is no character 's' in the query site having the same weight as the subject character or if there are no rules generated for character 's', then all the characters in the source collating sequence and the remote collating sequence are unmarked as an initialization step, at step 610. If there is a character 's' at the query site having the same weight as the subject character and if the rules have been generated for the character 's', then the subject character is added to the head of the rules for the character 's', at step 620.

At step 630, each character in the source and remote collating sequences that have a lower weight than the subject character are marked. Each character in the remote collating sequence that has the same weight as the character 's' at the query site is marked, at step 640. Intervals are then created, at step 650, comprising adjacent marked characters in the remote collating sequence.

It is then determined, at step 660, if the marked characters in the remote collating sequence are a superset of the marked characters in the source collating sequence. If so, the intervals are provided as being imprecise, at step 680. If the marked characters in the remote collating sequence are not a superset of the marked characters in the source collating sequence, the intervals are provided as being precise, at step 670.

Applying the method of FIG. 8 to the example sequences above results in the following rules for characters "a" to "h".

| 'a', 'b', 'c' | 'd', 'e', 'f' |
|---|---|
| ==> [' ', '9'] | ~=> [' ', 'd'] |
| ~=> [' ', 'd'] | ==> [' ', 'f'] |
| ~=> ['a', ' '] | ==> ['g', ' '] |
| ==> ['a', ' '] | ~=> ['a', ' '] |
| 'g' | >h= |
| ==> [' ', 'f'] | ~=> [' ', 'h'] |
| ~=> [' ', 'h'] | ==> [' ', 'h'] |
| ~=> ['g', ' '] | ==> ['i', ' '] |
| ==> ['g', ' '] | ~=> ['g', ' '] |

A character (or same-weight character set) may generate any combination of precise and imprecise rules. The rules that are applied during conversion of a predicate determine whether the resulting predicate is precise or imprecise. With the rules available, predicate conversion and simplification can be achieved using the methods described above.

Predicates consisting of an equality comparison between a column or field and a constant are frequently used and typically have high selectivity. Pushing down this type of predicate is particularly beneficial in practice because of the high data reduction. When the characters have unique weights in both the source and target collating sequences, the result does not depend on the sort order; therefore, in that case, equality predicates can be pushed down unchanged. However, if some characters have the same weight, this is not necessarily true. For example, the predicate x="abc" will select "ABC", "Abc", "aBC", etc. in a case insensitive collating sequence, but not in case sensitive one.

One solution is to convert an equality predicate to a conjunction of two atomic predicates with $\geq$ and $\leq$ respectively, because x=String is equivalent to (x$\geq$String AND x$\leq$String). The predicate can then be converted using the methods described above. However, the conversion and simplification can be tedious and time consuming. Therefore, rules have been developed in accordance with the present invention that are particular to equality predicates to simplify the conversion process.

The rule is a correspondence of same-weight character sets between the source and the target collating sequences. Again, precise rules and imprecise rules exist. The method described above with respect to FIG. 8 can be used to construct the rules. The only difference is to change the language in step 630 from "has a lower weight than the subject character" to "has the same weight as the subject character". So instead of having four rules, there are five rules for each character or same-weight character set. Shown below are examples of the fifth rule for the three cases described above:

CASE 1:
'c', 'C'
==>'c', 'C'

CASE 2:
'c'
~=>'c', 'C'

CASE 3:
'a', 'b', 'c'
~=>'a', 'b', 'c', 'd'

'd', 'e', 'f'
~=>'a', 'b', 'c', 'd', 'e', 'f'

'g'
~=>'g', 'h'

For single-character constants conversion is straightforward. For example, in CASE 3, a predicate X="e" is converted into:
X='a' or X='b' or X='c' or
X='d' or X='e' or X='f'

When a predicate is a comparison between a column or field and a long string, the converted predicates can be very long. For a predicate such as x="abcd", in case insensitive sort order where each character has two choices, a disjunction of $2^5=32$ atomic predicates is obtained. This is not practical; therefore, for long strings, the method described above for truncating the string is used. Using this approach, the predicate is changed into x>"abc" AND x<"abd", which is imprecise.

However, in practice, many long strings can be converted precisely because the characters occurring in the string have unique weights in both collating sequences. One example of this is phone numbers. Phone numbers are typically stored as strings even though they are numeric. Digits have unique weights so an equality comparison with an all-digit string constant needs not be converted at all.

Predicates using <>, such as x<>"abc", are very similar to = in the sense that it is equivalent to a disjunction of two atomic predicates (x<"abc" OR x>"abc"). However, predicates of this type often have poor reduction power, because the conversion may result in many predicates which increase the evaluation cost at the remote database system. So it might be desirable to simply drop these types of predicates and evaluate them at the query site.

Multiple Sets of Weights

The embodiments described thus far have assumed that both the source and the target collating sequences each use only one set of weights. This approach is not sufficient to handle all languages and collating sequences: some use multiple sets of weights. Multiple sets of weights involve a primary set, a secondary set, a tertiary set, etc., up to as many as are desired. When a collating sequence uses multiple sets of weights, imprecise conversion can be achieved. The description below is directed to the case when only the target collating sequence has multiple sets of weights. Logically this can be viewed as creating a multipart sort key: the first part is formed by using the character weights in the primary set, the second part by using the weights in the secondary set, and so on. Comparisons are then done in the standard way for multipart keys: compare the first parts; if they are equal, compare the second parts; and so on.

Table 2 lists the collation weights of visible ASCII characters in English_USA. It shows the hexadecimal value, i.e., the code point of the character, the collation weights of case insensitive dictionary order, and the collation weights of case sensitive dictionary order. For hexadecimal sort order, the collation weight of a character is the hexadecimal value of the character—this is an example of a collating sequence in which each character has a unique (primary) weight. Case insensitive dictionary order is an example of the case when multiple characters may have the same (primary) weight, while case sensitive dictionary order is an example where the collating sequence has multiple sets of weights (which in fact is also a unique weight collating sequence).

A character as shown may have up to five different weights (shown separated by bars in Table 2), although any number of different weights can be used. The first weight is the primary weight (used for the first compare pass); the second weight is the diacritic weight for accent compare, for example; the third weight is the case weight for case sensitive/insensitive, for example; the fourth weight is an extra weight mainly used to differentiate between Katakana and Hiragana in Japanese, for example; and the last weight is a special weight, used for position dependant differentiation, for example. In Table 2, most weights are empty except the primary weights. Only for the case sensitive case, do the upper case letters have a third level weight.

TABLE 2

| | Hexadecimal Value | Case Insensitive | Case Sensitive Weight |
|---|---|---|---|
| ! | 21 | 071c\|\|\|\|\| | 071c\|\|\|\|\| |
| " | 22 | 071d\|\|\|\|\| | 071d\|\|\|\|\| |
| # | 23 | 071f\|\|\|\|\| | 071f\|\|\|\|\| |
| $ | 24 | 0721\|\|\|\|\| | 0721\|\|\|\|\| |
| % | 25 | 0723\|\|\|\|\| | 0723\|\|\|\|\| |
| & | 26 | 0725\|\|\|\|\| | 0725\|\|\|\|\| |
| ' | 27 | 0680\|\|\|\|\| | 0680\|\|\|\|\| |
| ( | 28 | 0727\|\|\|\|\| | 0727\|\|\|\|\| |
| ) | 29 | 072a\|\|\|\|\| | 072a\|\|\|\|\| |
| * | 2a | 072d\|\|\|\|\| | 072d\|\|\|\|\| |
| + | 2b | 0803\|\|\|\|\| | 0803\|\|\|\|\| |
| , | 2c | 072f\|\|\|\|\| | 072f\|\|\|\|\| |
| - | 2d | 0682\|\|\|\|\| | 0682\|\|\|\|\| |
| . | 2e | 0733\|\|\|\|\| | 0733\|\|\|\|\| |
| / | 2f | 0735\|\|\|\|\| | 0735\|\|\|\|\| |
| 0 | 30 | 0c03\|\|\|\|\| | 0c03\|\|\|\|\| |
| 1 | 31 | 0c21\|\|\|\|\| | 0c21\|\|\|\|\| |
| 2 | 32 | 0c33\|\|\|\|\| | 0c33\|\|\|\|\| |
| 3 | 33 | 0c46\|\|\|\|\| | 0c46\|\|\|\|\| |
| 4 | 34 | 0c58\|\|\|\|\| | 0c58\|\|\|\|\| |
| 5 | 35 | 0c6a\|\|\|\|\| | 0c6a\|\|\|\|\| |
| 6 | 36 | 0c7d\|\|\|\|\| | 0c7d\|\|\|\|\| |

TABLE 2-continued

| | Hexadecimal Value | Case Insensitive | Case Sensitive Weight |
|---|---|---|---|
| 7 | 37 | 0c90\|\|\|\|\| | 0c90\|\|\|\|\| |
| 8 | 38 | 0ca2\|\|\|\|\| | 0ca2\|\|\|\|\| |
| 9 | 39 | 0cb4\|\|\|\|\| | 0cb4\|\|\|\|\| |
| : | 3a | 0737\|\|\|\|\| | 0737\|\|\|\|\| |
| ; | 3b | 073a\|\|\|\|\| | 073a\|\|\|\|\| |
| < | 3c | 080e\|\|\|\|\| | 080e\|\|\|\|\| |
| = | 3d | 0812\|\|\|\|\| | 0812\|\|\|\|\| |
| > | 3e | 0814\|\|\|\|\| | 0814\|\|\|\|\| |
| ? | 3f | 073c\|\|\|\|\| | 073c\|\|\|\|\| |
| @ | 40 | 073e\|\|\|\|\| | 073e\|\|\|\|\| |
| A | 41 | 0e02\|\|\|\|\| | 0e02\|\|12\|\|\| |
| B | 42 | 0e09\|\|\|\|\| | 0e09\|\|12\|\|\| |
| C | 43 | 0e0a\|\|\|\|\| | 0e0a\|\|12\|\|\| |
| D | 44 | 0e1a\|\|\|\|\| | 0e1a\|\|12\|\|\| |
| E | 45 | 0e21\|\|\|\|\| | 0e21\|\|12\|\|\| |
| F | 46 | 0e23\|\|\|\|\| | 0e23\|\|12\|\|\| |
| G | 47 | 0e25\|\|\|\|\| | 0e25\|\|12\|\|\| |
| H | 48 | 0e2c\|\|\|\|\| | 0e2c\|\|12\|\|\| |
| I | 49 | 0e32\|\|\|\|\| | 0e32\|\|12\|\|\| |
| J | 4a | 0e35\|\|\|\|\| | 0e35\|\|12\|\|\| |
| K | 4b | 0e36\|\|\|\|\| | 0e36\|\|12\|\|\| |
| L | 4c | 0e48\|\|\|\|\| | 0e48\|\|12\|\|\| |
| M | 4d | 0e51\|\|\|\|\| | 0e51\|\|12\|\|\| |
| N | 4e | 0e70\|\|\|\|\| | 0e70\|\|12\|\|\| |
| O | 4f | 0e7c\|\|\|\|\| | 0e7c\|\|12\|\|\| |
| P | 50 | 0e7e\|\|\|\|\| | 0e7e\|\|12\|\|\| |
| Q | 51 | 0e89\|\|\|\|\| | 0e89\|\|12\|\|\| |
| R | 52 | 0e8a\|\|\|\|\| | 0e8a\|\|12\|\|\| |
| S | 53 | 0e91\|\|\|\|\| | 0e91\|\|12\|\|\| |
| T | 54 | 0e99\|\|\|\|\| | 0e99\|\|12\|\|\| |
| U | 55 | 0e9f\|\|\|\|\| | 0e9f\|\|12\|\|\| |
| V | 56 | 0ea2\|\|\|\|\| | 0ea2\|\|12\|\|\| |
| W | 57 | 0ea4\|\|\|\|\| | 0ea4\|\|12\|\|\| |
| X | 58 | 0ea6\|\|\|\|\| | 0ea6\|\|12\|\|\| |
| Y | 59 | 0ea7\|\|\|\|\| | 0ea7\|\|12\|\|\| |
| Z | 5a | 0ea9\|\|\|\|\| | 0ea9\|\|12\|\|\| |
| [ | 5b | 073f\|\|\|\|\| | 073f\|\|\|\|\| |
| \ | 5c | 0741\|\|\|\|\| | 0741\|\|\|\|\| |
| ] | 5d | 0742\|\|\|\|\| | 0742\|\|\|\|\| |
| ^ | 5e | 0743\|\|\|\|\| | 0743\|\|\|\|\| |
| _ | 5f | 0744\|\|\|\|\| | 0744\|\|\|\|\| |
| ` | 60 | 0748\|\|\|\|\| | 0748\|\|\|\|\| |
| a | 61 | 0e02\|\|\|\|\| | 0e02\|\|\|\|\| |
| b | 62 | 0e09\|\|\|\|\| | 0e09\|\|\|\|\| |
| c | 63 | 0e0a\|\|\|\|\| | 0e0a\|\|\|\|\| |
| d | 64 | 0e1a\|\|\|\|\| | 0e1a\|\|\|\|\| |
| e | 65 | 0e21\|\|\|\|\| | 0e21\|\|\|\|\| |
| f | 66 | 0e23\|\|\|\|\| | 0e23\|\|\|\|\| |
| g | 67 | 0e25\|\|\|\|\| | 0e25\|\|\|\|\| |
| h | 68 | 0e2c\|\|\|\|\| | 0e2c\|\|\|\|\| |
| i | 69 | 0e32\|\|\|\|\| | 0e32\|\|\|\|\| |
| j | 6a | 0e35\|\|\|\|\| | 0e35\|\|\|\|\| |
| k | 6b | 0e36\|\|\|\|\| | 0e36\|\|\|\|\| |
| l | 6c | 0e48\|\|\|\|\| | 0e48\|\|\|\|\| |
| m | 6d | 0e51\|\|\|\|\| | 0e51\|\|\|\|\| |
| n | 6e | 0e70\|\|\|\|\| | 0e70\|\|\|\|\| |
| o | 6f | 0e7c\|\|\|\|\| | 0e7c\|\|\|\|\| |
| p | 70 | 0e7e\|\|\|\|\| | 0e7e\|\|\|\|\| |
| q | 71 | 0e89\|\|\|\|\| | 0e89\|\|\|\|\| |
| r | 72 | 0e8a\|\|\|\|\| | 0e8a\|\|\|\|\| |
| s | 73 | 0e91\|\|\|\|\| | 0e91\|\|\|\|\| |
| t | 74 | 0e99\|\|\|\|\| | 0e99\|\|\|\|\| |
| u | 75 | 0e9f\|\|\|\|\| | 0e9f\|\|\|\|\| |
| v | 76 | 0ea2\|\|\|\|\| | 0ea2\|\|\|\|\| |
| w | 77 | 0ea4\|\|\|\|\| | 0ea4\|\|\|\|\| |
| x | 78 | 0ea6\|\|\|\|\| | 0ea6\|\|\|\|\| |
| y | 79 | 0ea7\|\|\|\|\| | 0ea7\|\|\|\|\| |
| z | 7a | 0ea9\|\|\|\|\| | 0ea9\|\|\|\|\| |
| { | 7b | 074a\|\|\|\|\| | 074a\|\|\|\|\| |
| \| | 7c | 074c\|\|\|\|\| | 074c\|\|\|\|\| |
| } | 7d | 074e\|\|\|\|\| | 074e\|\|\|\|\| |
| ~ | 7e | 0750\|\|\|\|\| | 0750\|\|\|\|\| |

Based on this table, the following collating sequences are obtained:

Binary order:
!\"#$%&'( )*+,./0123456789:;<=>?@ABCDEFGHIJKLMNOPQRSTUVWXYZ[\\]^_ abcdefghijklmnopqrstuvwxyz{|}~

Case insensitive dictionary order (where uppercase and lowercase letters are equal):
'-!\"#$%&( )*,./:;?@[\\]^_'{|}~+<= 0123456789aAbBcCdDeEfFgGhHiIjJkKlLmM nNoOpPqQrRsStTuUvVwWxXyYzZ Case sensitive dictionary order compares strings in the same order as case insensitive order in the first pass. If two strings are equal in the first pass using primary weights, then in the second pass, the strings are compared using case weight (no diacritic weight here) to differentiate the two strings where the uppercase character has a greater weight than the lowercase character.

String comparisons under different collating sequences is a complex issue. Comparisons are based on weights assigned to characters to reflect their collation order. The present invention is directed to three cases: (1) all characters having unique weight, (2) some characters have equal weights, and (3) characters with multiple weights. The first and third case affect comparisons with operator $<, \leq, >$, and $\geq$. However, the second case also affects equality predicates, which are commonly used and have high selectivity.

Assume that the target collating sequence has the same primary weights for the characters $c_1, c_2, \ldots, c_n$ but different secondary weights. The precise values of the secondary weights are unimportant so assume that they are $1, 2, \ldots, n$, respectively. Consider the comparison $X \leq s_1$ and what characters in the target collating sequence should be included in the rule for $\leq$. If a character $s_2$ which is less than or equal to $s_1$ in the source collating sequence, maps to one of the characters in $c_1 c_1, \ldots, c_n$ then all the characters of $c_1, c_1, \ldots, c_n$ are included in the rule because they are not distinguished at the first level of comparison. This applies, in particular, if $s_2 = s_1$.

If the marking method described above is used, all characters are marked that have a primary weight less than or equal to the primary weight of $s_1$. Once the marking has been performed, intervals are created. However, several characters may now lie on the boundary of an interval because they have the same primary weight. Selection then proceeds based on their secondary weights. If this happens on the lower bound of an interval, the one with the lowest secondary weight is chosen. If it happens on the upper bound, the one with the highest secondary weight is chosen. If secondary weights do not separate them either, tertiary weights are considered, and so on. In this way, intervals are created that are guaranteed to include every character in the target collating sequence that corresponds to a character which is less than or equal to $s_1$ in the source collating sequence (and possibly some more). The conversion method is described with respect to the flowchart shown in FIG. 9. Since the conversion will be imprecise in any case, only two rules are used: one for <and $\leq$ and one for >and $\geq$.

Initially, at step 700, a character "t" to be sorted or searched against is chosen at the query site. All the characters in the remote collating sequence are initialized or unmarked at step 710. The weight of each character "s" in the remote collating sequence is compared against the weight of character "t" at step 720. If the character "s" has a lower weight, it is marked along with every character in the remote collating sequence that has the same primary weight as the character "s". At step 730, sequences of adjacent marked characters in the remote collating sequence are determined. For each sequence, at step 740, an interval is created between a character in the sequence having the lowest primary weight and the highest primary weight. The interval is checked at step 750 to determine if there is more than one character in the sequence having the lowest primary weight and/or the highest primary weight. If there is more than one character in the sequence having the lowest primary weight, at step 760, the interval endpoint is changed to the character having the next lowest primary weight. Similarly, if there is more than one character in the sequence having the highest primary weight, the interval endpoint is changed to the character having the next highest primary weight. This process repeats, via step 750, until the endpoints for the intervals are characters having a unique primary weight. At this point, the interval is provided as the rule for that operator and subject character. The intervals are outputted as the rule for x<t and x$\geq$t.

For example, assuming that the character set includes only ten characters (a–e, A–E), the source collating sequence is abcdeABCDE and the primary and secondary weights of the target collating sequence are as shown below.

| Character | Primary weight | Secondary weight |
|---|---|---|
| A | 1 | 1 |
| a | 1 | 2 |
| B | 2 | 1 |
| b | 2 | 2 |
| C | 3 | 1 |
| c | 3 | 2 |
| D | 4 | 1 |
| d | 4 | 2 |
| E | 5 | 1 |
| e | 5 | 2 |

Figure 9:
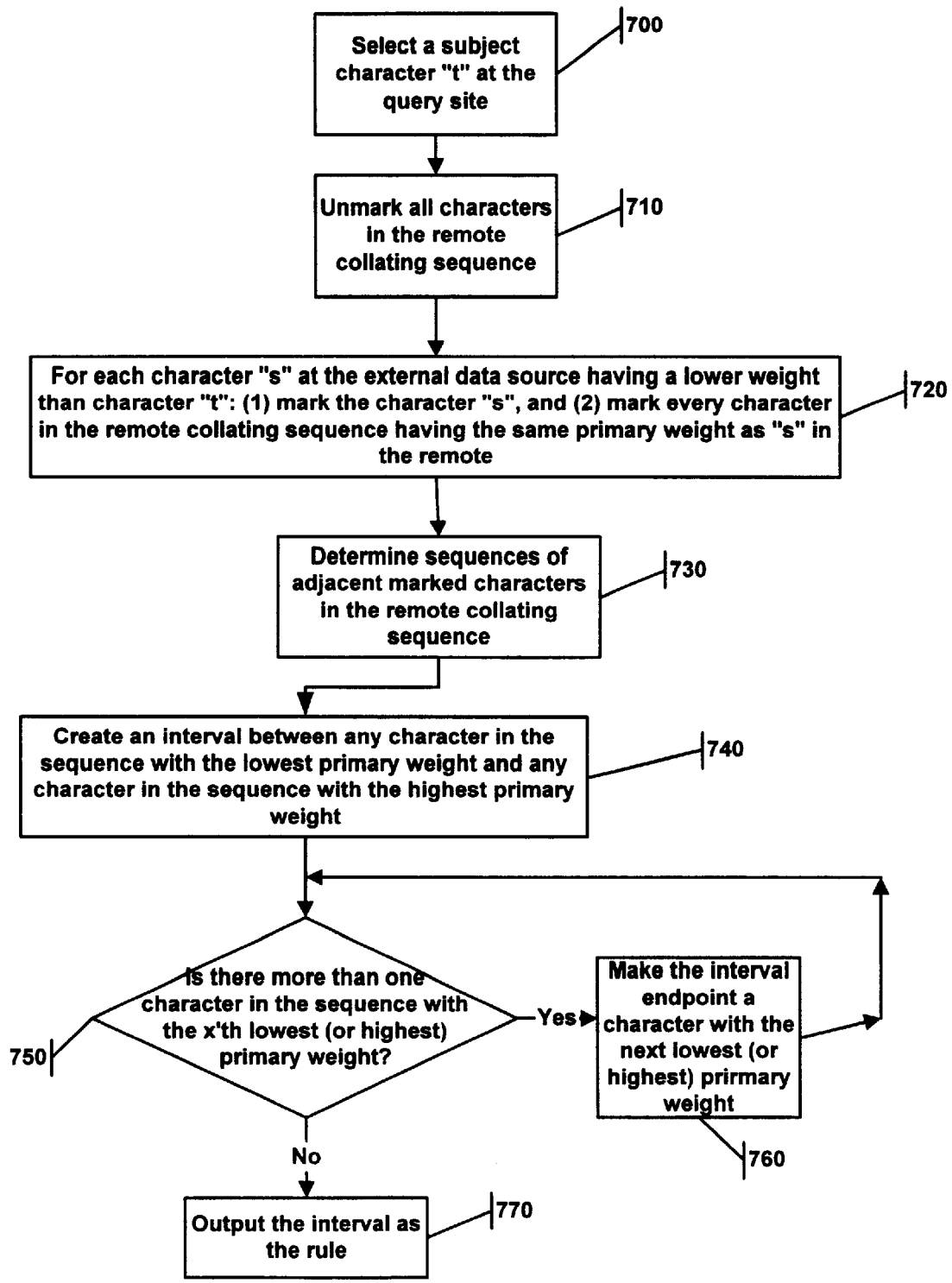
FIG. 9 is a flowchart of an exemplary method for generating the rules of the less than (<) operator when the characters in the collating sequences have multiple sets of weights.

The method of FIG. 9 generates the following rules for "c" and "C".

'c' $\Rightarrow$ (<, $\leq$): ['A', 'c']

(>, $\geq$): ['A', 'e']

'C' $\Rightarrow$ (<, $\leq$): ['A', 'e']

(>, $\geq$): ['A', 'e']

Note that the rules for "C" do not add any information because the interval covers all characters. Based on the rule for "c", the predicate X<"c" would be converted to X$\geq$'A' and X$\leq$'c'. This may appear to be an exact conversion but it is not. To satisfy the source predicate, the value has to begin with "a", "b", or "c". When evaluating the converted predicate, any character with a primary weight less than or equal to three is acceptable, that is, any one of "a", "b", "c", "A", "B", and "C".

Sometimes, special sort elements, such as the hyphen and apostrophe, are treated differently than other punctuation symbols, so that words like coop and co-op stay together in a list. In Windows NT, this is achieved by having the primary weight being empty, then differentiated by another level weight (Special Weight). This is a special case of multiple level weights with some characters having minimum primary weight (empty).

The following examples are based on the collating sequences shown in Table 2. For conversion between unique and non-unique weight collations, the rules for the same characters '3', 'B', and 't' are shown below based on binary order and case insensitive dictionary order. Five rules are shown corresponding to operator <, ≦, >, ≧, and =, respectively. Each rule can be either a precise conversion rule (represented by ==>) or an imprecise conversion rule (represented by ~=>). The empty character, represented by '', is the beginning or end of a target collating sequence.

Case 1: source collating sequence is case insensitive order, target collating sequence is binary order:

```
'3'
==> ['', '2'] [':', '@'] ['[', '`'] ['{', '']     // for < operator
==> ['', '3'] [':', '@'] ['[', '`'] ['{', '']     // for ≦ operator
==> ['4', '9'] ['A', 'Z'] ['a', 'z']              // for > operator
==> ['3', '9'] ['A', 'Z'] ['a', 'z']              // for ≧ operator
==> '3'                                            // for = operator
'b', 'B'
==> ['', 'A'] ['[', 'a'] ['{', '']                // for < operator
==> ['', 'B'] ['[', 'b'] ['{', '']                // for ≦ operator
==> ['C', 'Z'] ['c', 'z']                         // for > operator
==> ['B', 'Z'] ['b', 'z']                         // for ≧ operator
==> 'b', 'B'                                       // for = operator
't', 'T'
==> ['', 'S'] ['[', 's'] ['{', '']                // for < operator
==> ['', 'T'] ['[', 't'] ['{', '']                // for ≦ operator
==> ['U', 'Z'] ['u', 'z']                         // for > operator
==> ['T', 'Z'] ['t', 'z']                         // for ≧ operator
==> 't', 'T'                                       // for = operator
```

Case 2: source collating sequence is binary order, target collating sequence is case insensitive order:

```
'3'
==> ['', '/'] ['0', '2']         // for < operator
==> ['', '/'] ['0', '3']         // for ≦ operator
==> [':', '>'] ['4', '']         // for > operator
==> [':', '>'] ['3', '']         // for ≧ operator
==> '3'                           // for = operator
'B',
~=> ['', '@'] ['+', 'a']          // for < operator
~=> ['', '@'] ['+', 'b']          // for ≦ operator
~=> ['[', '~'] ['A', '']          // for > operator, since it includes 'a'
~=> ['[', '~'] ['A', '']          // for ≧ operator, since it includes 'a'
~=> 'B'                           // for = operator
't',
~=> ['', '`'] ['+', '']           // for < operator, since it includes 'Z'
~=> ['', '`'] ['+', '']           // for ≦ operator, since it includes 'Z'
~=> ['{', '~'] ['u', '']          // for > operator
~=> ['{', '~'] ['t', '']          // for ≧ operator
~=> 'T'                           // for = operator
```

For collating sequence with multiple level weights, below are exemplary rules between binary order and case sensitive dictionary order.

Case 1: source collating sequence is binary order, target collating sequence is case sensitive order:

```
'3'
==> ['', '/'] ['0', '2']         // for < operator
==> ['', '/'] ['0', '3']         // for ≦ operator
==> [':', '>'] ['4', '']         // for > operator
==> [':', '>'] ['3', '']         // for ≧ operator
==> '3'                           // for = operator
'B',
==> ['', '@'] ['+', 'A']          // for < operator
```

-continued

```
~=> ['', '@'] ['+', 'B']          // for ≦ operator
~=> ['[', '~'] ['A', '']          // for > operator, since it includes 'a'
~=> ['[', '~'] ['A', '']          // for ≧ operator, since it includes 'a'
==> 'B'                           // for = operator
't',
~=> ['', '`'] ['+', '']           // for < operator, since it includes 'Z'
~=> ['', '`'] ['+', '']           // for ≦ operator, since it includes 'Z'
==> ['{', '~'] ['u', '']          // for > operator
==> ['{', '~'] ['t', '']          // for ≧ operator
==> 't'                           // for = operator
```

Case 2: source collating sequence is case sensitive order, target collating sequence is binary order:

```
'3'
==> ['', '2'] [':', '@'] ['[', '`'] ['{', '']    // for < operator
==> ['', '3'] [':', '@'] ['[', '`'] ['{', '']    // for ≦ operator
==> ['4', '9'] ['A', 'Z'] ['a', 'z']             // for > operator
==> ['3', '9'] ['A', 'Z'] ['a', 'z']             // for ≧ operator
==> '3'                                           // for = operator
'B'
==> ['', 'A'] ['[', 'b'] ['{', '']               // for < operator
==> ['', 'B'] ['[', 'b'] ['{', '']               // for ≦ operator
==> ['C', 'Z'] ['c', 'z']                        // for > operator
==> ['B', 'Z'] ['b', 'z']                        // for ≧ operator
==> 'b', 'B'                                      // for = operator
't'
==> ['', 'S'] ['[', 's'] ['{', '']               // for < operator
==> ['', 'T'] ['[', 't'] ['{', '']               // for ≦ operator
==> ['U', 'Z'] ['u', 'z']                        // for > operator
==> ['T', 'Z'] ['t', 'z']                        // for ≧ operator
==> 't', 'T'                                      // for = operator
```

It should be noted that there are several special cases when predicates can be pushed down to a remote site without conversion. For example, if both the source and target collating sequences have unique weight characters, equality predicates can be pushed down to the target site directly. As described above, character translation may be implemented if the two collating sequences are based on different character sets. Moreover, in most collation sequences, the digital characters 0 to 9 have unique weights and the same order. Much application data, such as phone number, zip code, SIN, etc., contain only digital characters, or with limited symbols like '-' in fixed positions. String compare predicates on this type of data can be pushed down directly, or with minor changes if there are some additional symbols. Furthermore, if the character sets at both the source and target sites are ASCII compatible, that is, have ASCII code points 0 to 127 as part of the character set (which is true for most Windows NT character sets, except Unicode), and both sites use binary order for collation, then any comparison with a string containing only ASCII characters can be pushed down to the target site directly.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A method for use in a heterogeneous database environment including a first data source using a first collating sequence ($I_1$) and a second data source using a second collating sequence (I2), comprising the steps of:

receiving a query including a source predicate ($e_1$) for the first collating sequence $I_1$ having a first plurality of characters;

converting said source predicate $e_1$ to a target predicate ($e_2$) for the second collating sequence $I_2$ using a conversion rule generated by an operation of an operator, wherein said operator comprises one of less than (<), less than or equal to ($\leq$), greater than (>), and greater than or equal to ($\geq$), said subject character being one of the first plurality of characters; and submitting said target predicate $e_2$ to the second data source.

2. The method as recited in claim 1, wherein said predicate $e_1$ is converted to said target predicate $e_2$ based on a conversion table.

3. A computer readable storage medium on which is stored a conversion table for use in the method of claim 2.

4. A conversion table as recited in claim 3, comprising a plurality of rules for converting a plurality of characters from the first collating sequence $I_1$ operated on by one of a plurality of operators to the second collating sequence $I_2$, such that said query comprising said predicate $e_1$ is converted to said target predicate $e_2$ by utilizing said rules.

5. The conversion table as recited in claim 4, wherein each of said plurality of rules is one of precise and imprecise.

6. The method as recited in claim 1, further comprising the step of simplifying said target predicate $e_2$ prior to the step of submitting said second query including said target predicate $e_2$ to the second data source.

7. The method as recited in claim 6, wherein the step of simplifying comprises at least one of the steps of combining range values, exploiting domain constraints, and reducing to prime implicants.

8. The method as recited in claim 7, wherein the step of combining range values comprises the steps of:

obtaining a set of intervals in said target predicate $e_2$; and combining said intervals into at least one interval in accordance with an intersection or union of said intervals.

9. The method as recited in claim 7, wherein the step of exploiting domain constraints comprises the steps of:

detecting at least one external constraint at the second data source; and modifying said target predicate $e_2$ responsive to said at least one external constraint.

10. The method as recited in claim 7, wherein the step of reducing to prime implicants comprises the steps of:

converting said target predicate $e_2$ to conjunctive normal form;

eliminating redundant atomic predicates from said target predicate $e_2$;

converting said target predicate $e_2$ to disjunctive normal form;

deleting contradictory terms and empty ranges from said target predicate $e_2$; and converting said target predicate $e_2$ to conjunctive normal form.

11. The method as recited in claim 1, wherein each of the first and second collating sequences comprises a member of the group consisting of ASCII and EBCDIC.

12. The method as recited in claim 1, wherein the step of converting comprises a step of imprecise conversion of said predicate $e_1$.

13. The method as recited in claim 12, wherein said predicate $e_1$ comprises a plurality of predicates, the step of imprecise conversion comprises discarding at least one of said plurality of predicates.

14. The method as recited in claim 12, wherein said predicate $e_1$ comprises a comparison between a column and a string of characters, the step of imprecise conversion comprises truncating said string of characters.

15. The method as recited in claim 12, wherein said predicate $e_1$ comprises a plurality of ranges, the step of imprecise conversion comprises merging at least two of said plurality of ranges into a single range that covers said at least two ranges.

16. A method for generating a conversion rule for a conversion table between a first collating sequence ($I_1$) having a first plurality of characters, each having a respective weight, and a second collating sequence ($I_2$) having a second plurality of characters, each having a respective weight, comprising the steps of:

for a subject character operated on by an operator, said subject character being one of the first plurality of characters and said operator being one of less than (<), less than or equal to ($\leq$), greater than (>), and greater than or equal to ($\geq$), determining which ones of the first plurality of characters in the first collating sequence have a weight that satisfies said operator operating on said subject character;

detecting the characters in the second collating sequence that correspond to the first plurality of characters that have been determined to have a weight that satisfies said operator operating on said subject character; and determining at least one interval of the detected characters, the conversion rule being responsive to said at least one interval.

17. The method as recited in claim 16, further comprising the step of OR'ing each interval of said at least one interval together to form the conversion rule.

18. The method as recited in claim 16, wherein each respective weight in the first collating sequence is different and each respective weight in the second collating sequence is different.

19. The method as recited in claim 16, wherein each respective weight consists of only one weight.

20. The method as recited in claim 16, wherein at least two respective weights in one of the first collating sequence and the second collating sequence are identical, further comprising the steps of:

determining which of said characters in the first collating sequence have the same weight as said subject character; and prior to determining said at least one interval, detecting the characters in the second collating sequence that correspond to the first plurality of characters that have been determined to have the same weight as said subject character.

21. The method as recited in claim 16, wherein each respective weight comprises at least a primary weight and a secondary weight, and further comprising the steps of:

detecting each character in the second collating sequence that has the same primary weight as the character that corresponds to said subject character;

determining sequences of adjacent detected characters at the second collating sequence;

determining which of said detected characters has a lowest primary weight;

determining which of said detected characters has a highest primary weight;

determining at least one interval of the characters of the second collating sequence having said lowest primary weight character and said highest primary weight character as a lowest and a highest endpoint, respectively;

determining if there is more than one character in each said interval that has said lowest primary weight, and if so, changing said lowest endpoint to a character having a next lowest primary weight; and determining if there is more than one character in each said interval that has said highest primary weight, and if so, changing said highest endpoint to a character having a next highest primary weight.

22. A heterogeneous database system, comprising:

a first data source using a first collating sequence ($I_1$) having a first plurality of characters;

a second data source using a second collating sequence ($I_2$);

a conversion table generator using a conversion rule generated by an operation of an operator, wherein said operator is one of less than (<), less than or equal to ($\leq$), greater than (>), and greater than or equal to, ($\geq$), on a subject character, said subject character being one of the first plurality of characters;

a conversion table generated by said conversion table generator; and a predicate converter for receiving a query including a source predicate ($e_1$) for $I_1$ and, using said conversion table, converting $e_1$ to a target predicate ($e_2$) for $I_2$.

23. The database system as recited in claim 22, further comprising a predicate simplifier for simplifying said target predicate $e_2$.

24. The database system as recited in claim 23, wherein said rule is one of precise and imprecise.

25. The database system as recited in claim 22, wherein said first collating sequence $I_1$ and said second collating sequence $I_2$ each comprise a plurality of characters, each character having a weight, at least two of said characters in at least one of said first and second collating sequences having identical weights.

26. The database system as recited in claim 22, wherein said first collating sequence $I_1$ and said second collating sequence $I_2$ each comprise a plurality of characters, each character having multiple weights.

* * * * *

UNITED STATES PATENT AND TRADEMARK OFFICE
CERTIFICATE OF CORRECTION

PATENT NO.      : 6,381,616 B1
DATED           : April 30, 2002
INVENTOR(S)     : Gustav Per-Åke Larson and Weiye Zhang It is certified that error appears in the above-identified patent and that said Letters Patent is hereby corrected as shown below:

Drawings
FIG. 9, reference number 760, "prirmary" should read -- primary --.

Column 10,
Line 27, ""3"" should begin a new paragraph.
Line 35, ""B"" should begin a new paragraph.
Line 37, "] '0' " should read -- ['0' --.
Line 39, "`A' " should read -- [`A' --.
Line 43, "`C' " should read -- `B' --.

Column 11,
Third table in the column, 6$^{th}$ line from top; "`[ | ]P' " should read -- `\' --.

Column 15,
Lines 50-54, all four occurrences "=" should read -- = = --.

Column 20,
Line 38, from the top of table entries, first column, insert -- \ --.

Column 21,
Line 5, after "_", insert -- ` --.
Line 10, before "0", insert -- > --.

Column 24,
Line 64, "I2" should read -- $I_2$ --.

Signed and Sealed this

Twentieth Day of August, 2002

*Attest:*

JAMES E. ROGAN
*Attesting Officer*     *Director of the United States Patent and Trademark Office*